United States Patent
Becker et al.

(10) Patent No.: US 12,208,910 B2
(45) Date of Patent: Jan. 28, 2025

(54) COOLING SYSTEM CONFIGURATIONS FOR AN AIRCRAFT HAVING HYBRID-ELECTRIC PROPULSION SYSTEM

(71) Applicant: Pratt & Whitney Canada Corp., Longueuil (CA)

(72) Inventors: Frank Becker, Saint Lambert (CA); Eric LaTulipe, Sainte-Julie (CA); Xi Wang, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 162 days.

(21) Appl. No.: 17/885,789

(22) Filed: Aug. 11, 2022

(65) Prior Publication Data

US 2023/0019138 A1    Jan. 19, 2023

Related U.S. Application Data (62) Division of application No. 16/709,204, filed on Dec. 10, 2019, now Pat. No. 11,427,344.

(60) Provisional application No. 62/812,479, filed on Mar. 1, 2019.

(51) Int. Cl.
   *B64D 33/08* (2006.01)
   *B64D 27/02* (2006.01)

(52) U.S. Cl.
   CPC ............. *B64D 33/08* (2013.01); *B64D 27/02* (2013.01); *B64D 27/026* (2024.01)

(58) Field of Classification Search
   CPC .. B64D 27/02; B64D 2027/026; B64D 33/08; F02C 7/18
   USPC ....................................................... 244/53 R
   See application file for complete search history.

(56) References Cited

U.S. PATENT DOCUMENTS

| | | |
|---|---|---|
| 5,351,476 A | 10/1994 | Laborie et al. |
| 6,703,747 B2 | 3/2004 | Kawamura |
| 6,864,667 B2 | 3/2005 | Buening et al. |
| 7,122,933 B2 | 10/2006 | Horst et al. |
| 7,915,778 B2 | 3/2011 | Miyata et al. |
| 8,350,437 B2 | 1/2013 | Doushita et al. |
| 8,368,276 B2 | 2/2013 | Wolf et al. |
| 8,532,961 B2 | 9/2013 | Guo |
| 8,844,143 B2 | 9/2014 | Kirchner et al. |
| 9,174,741 B2 | 11/2015 | Suntharalingam et al. |

(Continued)

FOREIGN PATENT DOCUMENTS

| | | | |
|---|---|---|---|
| EP | 3594125 A1 | 1/2020 | |
| FR | 3042820 A1 * | 4/2017 | ............. B64D 33/08 |

(Continued)

OTHER PUBLICATIONS

International Search Report and Written Opinion issued in corresponding PCT Application No. PCT/US2019/065435, Dated Apr. 7, 2020.

(Continued)

*Primary Examiner* — Brady W Frazier
(74) *Attorney, Agent, or Firm* — NORTON ROSE FULBRIGHT CANADA LLP (57) ABSTRACT

A cooling system for an engine of an aircraft of a having hybrid-electric propulsion system including a nacelle body including a bottom cooling air intake disposed below a propeller hub for supplying air to an oil-air cooler, wherein the bottom cooling air intake includes a splitter dividing the bottom cooling air intake into a first channel and a second channel.

18 Claims, 8 Drawing Sheets

(56) References Cited

U.S. PATENT DOCUMENTS

| | | |
|---|---|---|
| 10,145,291 B1 | 12/2018 | Thomassin et al. |
| 10,170,954 B2 | 1/2019 | Taniguchi et al. |
| 10,326,326 B2 | 6/2019 | Laldin et al. |
| 10,494,117 B2 | 12/2019 | Bosma |
| 2005/0237766 A1 | 10/2005 | Klettke |
| 2005/0268612 A1 | 12/2005 | Rolt |
| 2006/0102779 A1 | 5/2006 | Campbell et al. |
| 2007/0240427 A1 | 10/2007 | Ullyott |
| 2008/0017426 A1 | 1/2008 | Walters et al. |
| 2008/0078876 A1 | 4/2008 | Baggette et al. |
| 2008/0141921 A1 | 6/2008 | Hinderks |
| 2009/0169359 A1 | 7/2009 | Murphy et al. |
| 2009/0314004 A1 | 12/2009 | Van Der Woude |
| 2010/0251692 A1 | 10/2010 | Kinde, Sr. |
| 2010/0270417 A1 | 10/2010 | Goldshteyn |
| 2011/0024555 A1 | 2/2011 | Kuhn, Jr. |
| 2011/0049293 A1 | 3/2011 | Koletzko |
| 2012/0012692 A1 | 1/2012 | Kroo |
| 2012/0111994 A1 | 5/2012 | Kummer et al. |
| 2012/0227389 A1 | 9/2012 | Hinderks |
| 2013/0020429 A1 | 1/2013 | Kroo |
| 2013/0068876 A1 | 3/2013 | Radu |
| 2013/0157017 A1 | 6/2013 | Guillemaut et al. |
| 2014/0180507 A1 | 6/2014 | Geay et al. |
| 2014/0205425 A1 | 7/2014 | Denius et al. |
| 2015/0183518 A1 | 7/2015 | Stuckl et al. |
| 2015/0210407 A1 | 7/2015 | Griffin et al. |
| 2015/0321752 A1 | 11/2015 | Trull et al. |
| 2016/0023747 A1 | 1/2016 | Kempshall |
| 2016/0144957 A1 | 5/2016 | Claridge et al. |
| 2016/0221680 A1 | 8/2016 | Burton et al. |
| 2016/0272310 A1 | 9/2016 | Chan et al. |
| 2016/0304199 A1 | 10/2016 | Chan et al. |
| 2016/0347446 A1 | 12/2016 | Vetter et al. |
| 2017/0021937 A1 | 1/2017 | Bustillo et al. |
| 2017/0320585 A1 | 11/2017 | Armstrong et al. |
| 2017/0335769 A1 | 11/2017 | Boujida et al. |
| 2017/0341725 A1 | 11/2017 | Skahan |
| 2018/0044028 A1 | 2/2018 | Takami et al. |
| 2018/0127103 A1 | 5/2018 | Cantemir |
| 2018/0141655 A1 | 5/2018 | Wall |
| 2018/0208305 A1 | 7/2018 | Lloyd et al. |
| 2018/0215462 A1 | 8/2018 | Fenny et al. |

FOREIGN PATENT DOCUMENTS

| | | |
|---|---|---|
| JP | 2014159255 A | 9/2014 |
| JP | WO2017126584 A1 | 12/2018 |
| KR | 20070039699 A | 4/2007 |
| KR | 101513661 B1 | 4/2015 |
| KR | 101752859 B1 | 6/2017 |
| WO | WO-2010020199 A1 | 2/2010 |
| WO | WO-2018058137 A1 | 3/2018 |
| WO | WO-2018099856 A1 | 6/2018 |
| WO | WO-2018104929 A1 | 6/2018 |

OTHER PUBLICATIONS

"Saab-2000-Powerplant-and-APU", Jan. 27, 1995 (Jan. 27, 1995), Retrieved from the Internet: URL:https://www.scribd.com/doc/255294743/Saab-2000-Powerplant-an•• APU [retrieved on Apr. 26, 2024].

"Fairchild-saab-340-inlet-nacelle", , Aug. 28, 2009 (Aug. 28, 2009), Retrieved from the Internet: URL:https://www.dvidshub.net/image/832837/fairchild-saab-340-inle••nacelle [retrieved on Apr. 26, 2024].

"Saab-340-saab-2000", , Jan. 1, 2018 (Jan. 1, 2018), Retrieved from the Internet: URL:https://www.aircraftrecognitionguide.com/saab-340-saab-2000 [retrieved on Apr. 26, 2024].

\* cited by examiner

COOLING SYSTEM CONFIGURATIONS FOR AN AIRCRAFT HAVING HYBRID-ELECTRIC PROPULSION SYSTEM

CROSS-REFERENCE TO RELATED APPLICATIONS

This application claims priority to U.S. Provisional Patent Application No. 62/812,479 filed Mar. 1, 2019 the contents of which are incorporated by reference herein in their entirety.

BACKGROUND

Technological Field

The disclosure is directed to a cooling system for an aircraft engine, and more particularly, to cooling system configurations for the engine-e of an aircraft having a hybrid-electric propulsion system.

Description of Related Art

The level of air traffic continues to increase worldwide, leading to increased fuel consumption and air pollution. Consequently, efforts are underway to make aircraft more environmentally compatible through the use of specific types of fuel and/or by reducing fuel consumption through the use of more efficient drive systems.

For example, aircraft having mixed drive systems that include a combination of various types of engines are known for reducing pollutants and increasing efficiency. Some current combinations include reciprocating engines and jet engines, reciprocating engines and rocket engines, jet engines and rocket engines, or turbojet engines and ramjet engines.

While these mixed drive systems are useful, they are not readily adaptable for use on commercial passenger aircraft. However, hybrid-electric propulsion systems that provide power through a combustion engine and an electric motor are indeed adaptable for use with commercial passenger aircraft and can provide efficiency benefits including reduced fuel consumption. The subject invention is directed to an aircraft having such a propulsion system. The conventional methods and systems have generally been considered satisfactory for their intended purpose. However, there is still a need in the art for a cooling system having improved efficiency and decreased size envelope. The present disclosure may provide a solution for at least one of these remaining challenges.

SUMMARY OF THE INVENTION

A cooling system for a nacelle of an engine of an aircraft having a hybrid-electric propulsion system includes a nacelle body defining a bottom cooling air intake disposed below a propeller hub for supplying air to an oil-air cooler, wherein the bottom cooling air intake includes a splitter dividing the bottom cooling air intake into a first channel and a second channel, wherein the splitter is vertically or horizontally aligned. The splitter can form three separate channels, with the first channel leading to a first heat exchanger, and the second channel leading to a second heat exchanger, and a third channel leading to a turbine compressor assembly, wherein the first heat exchanger is an air-oil heat exchanger, and the second heat exchanger is a glycol air heat exchanger. It is also conceived that wherein the splitter can be horizontally aligned forming two separate channels, with the first channel leading to a first heat exchanger, and the second channel leading to a second heat exchanger, where the first heat exchanger is an air-oil heat exchanger, and the second heat exchanger is a glycol air heat exchanger.

An aircraft can include the cooling system mentioned above attached to an underside of a first wing of the aircraft. An aircraft can include the cooling system mentioned above attached to both wings. The nacelle body can also include a heat motor engine therein and an electric motor therein connected to power a propeller.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
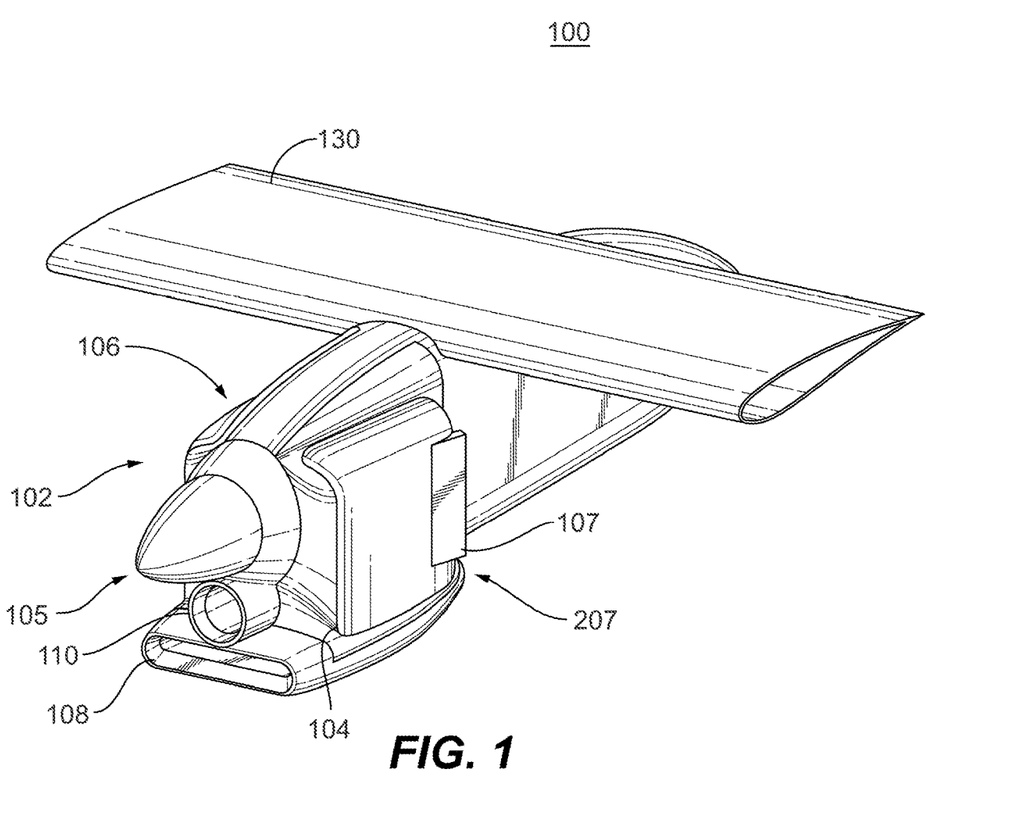
FIG. 1 is a perspective view of a cooling system configuration of an engine nacelle of an aircraft having hybrid-electric propulsion system.

Reference will now be made to the drawings wherein like reference numerals identify similar structural features or aspects of the subject invention. For purposes of explanation and illustration, and not limitation, a partial view of an exemplary embodiment of a cooling system in accordance with the invention is shown in FIG. 1a and 1b and is designated generally by reference character 100. Other embodiments of the cooling system in accordance with the invention, or aspects thereof, are provided in FIGS. 2a-5b, as will be described.

As seen in FIG. 1, a cooling system 100 for a nacelle of an engine of an aircraft having a hybrid-electric propulsion system includes a nacelle body 102, a first side cooling air intake 104 disposed on a first side of the nacelle body 102 and a second side cooling air intake 106 disposed opposite the first side cooling air intake with a propeller hub 105 disposed therebetween, and a bottom cooling air intake 108 disposed below propeller hub 105 for supplying air to an oil-air cooler. The bottom cooling air intake 108 is elongated in a direction from the first side cooling air intake and the second side cooling air intake.

Figure 2A:
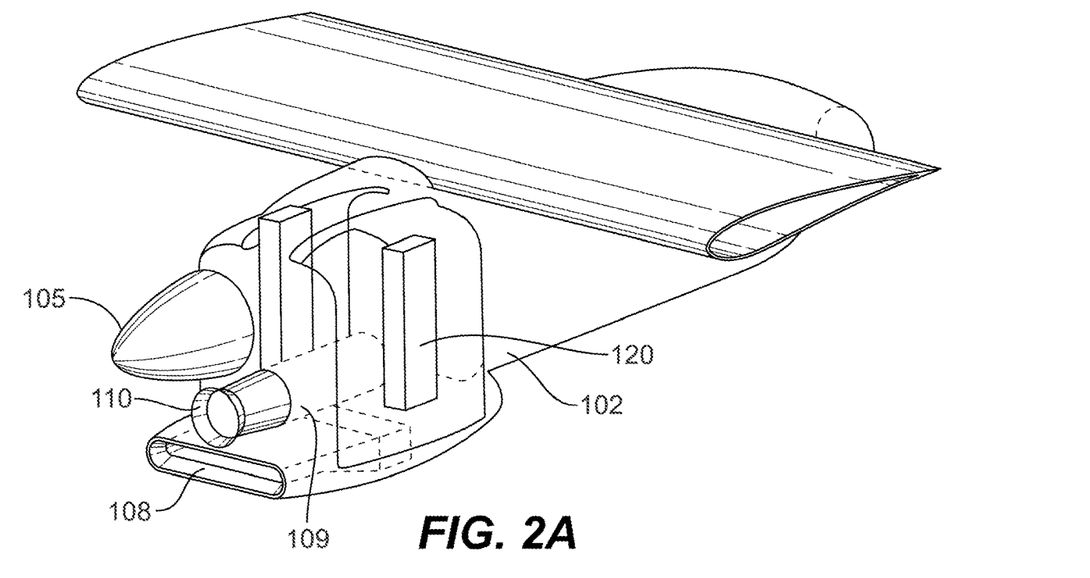
FIG. 2a is a perspective view of FIG. 1, showing the inner portions of the cooling system.

Further seen in FIG. 1, the first side cooling air intake 104 and the second side cooling air intake 106 each include an inlet defining an area elongated in a vertical direction with respect to gravity and an outlet 107 aft of the duct inlet, which includes a variable exhaust area controlled by an exhaust access door 207 configured for controlling a bypass for the cooling air. By partially closing the exhaust access door 207, the intake air is forced to spill over, resulting in less drag and less cooling air being supplied to the nacelle cooler. When the doors are opened further, more air is able to flow into each of the ducts, and in turn supply air to the heat exchangers. The first side cooling air intake 104 and the second side cooling air intake 106 can each be connected to a glycol/air heat exchanger 120 for cooling the hybrid-electric propulsion system, shown in FIG. 2.

An aircraft includes the cooling system 100 mentioned above attached to an underside of a first wing 130 of the aircraft. An aircraft can include the cooling system mentioned above attached to both wings. The nacelle body 102 includes a heat motor engine therein and an electric motor therein connected to power a propeller 105.

Figure 2B:
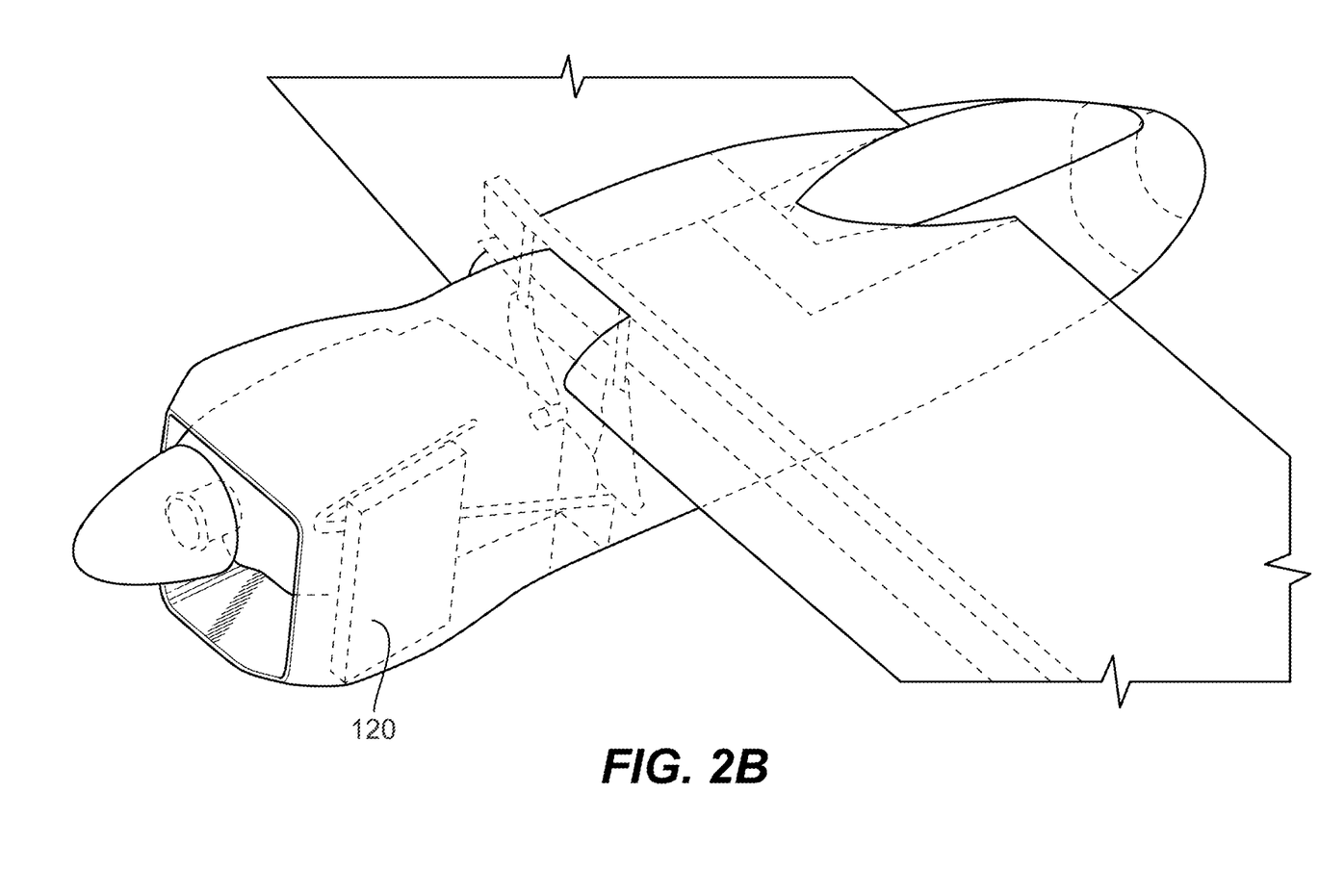
FIG. 2b is an alternate embodiment of FIG. 1, showing the heat exchangers slimmed and angled.
Figure 2C:
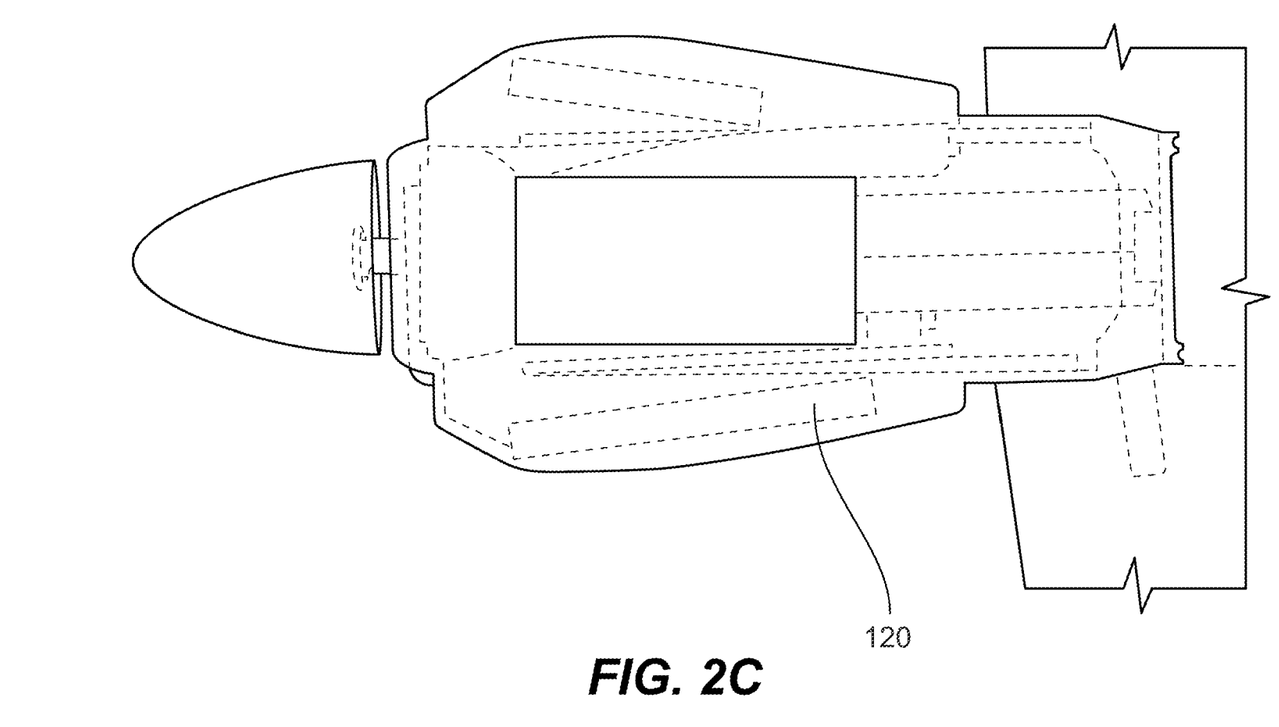
FIG. 2c is an a top view of FIG. 2b, showing the heat exchangers angled.

Shown in FIG. 2a, a turbine compressor intake 110 is disposed above the bottom cooling air intake 108 and below the propeller 105 for supplying air to the compressor turbine assembly 109. It is also conceived that a bottom cooling air intake 108 is not necessary. The turbine compressor intake 110 is concentrically connected to the compressor turbine assembly 109 located inside the nacelle body 102. A glycol cooler and two oil coolers are disposed within the nacelle body 102. FIGS. 2b and 2c show the glycol/air heat exchangers 120 slimmed and angled to decrease the profile of the nacelle.

Figure 3A:
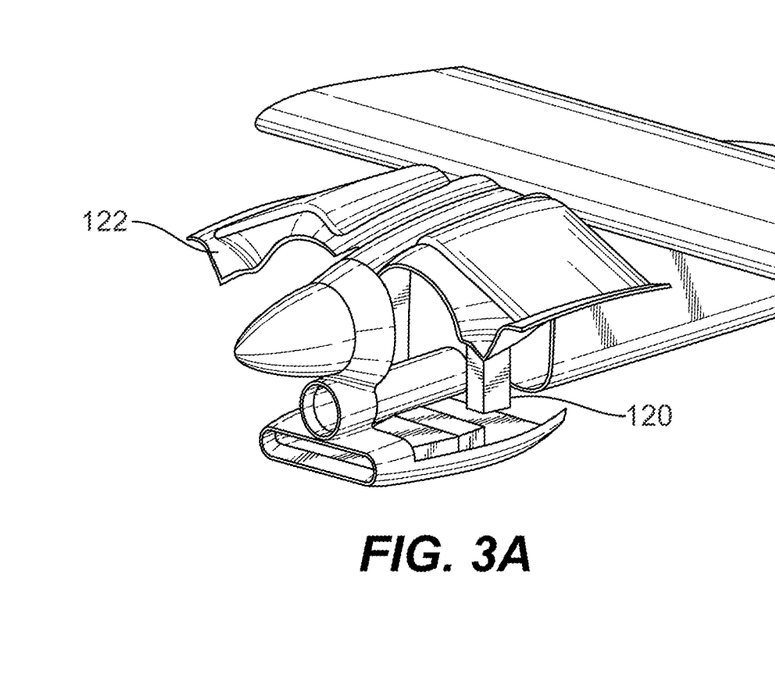
FIG. 3a is a perspective view of FIG. 1, showing the nacelle doors in an open position.
Figure 3B:
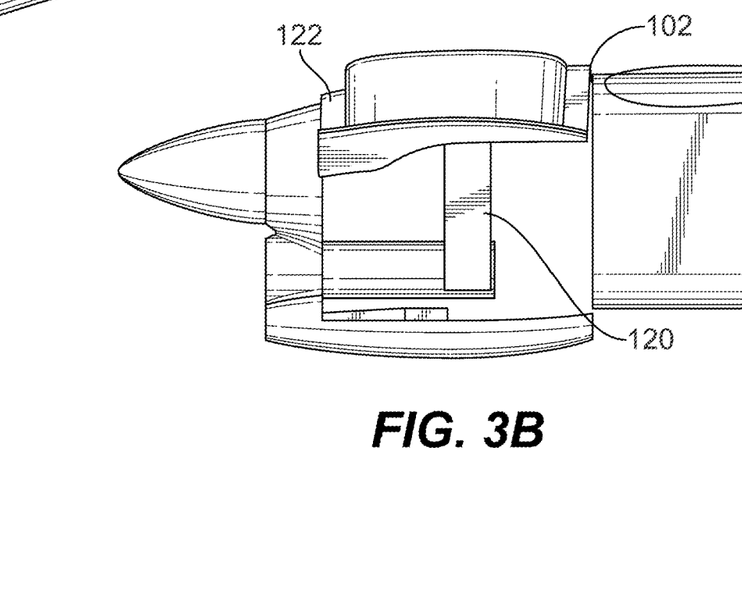
FIG. 3b is a side view of FIG. 1, showing the nacelle doors in an open position.
Figure 3C:
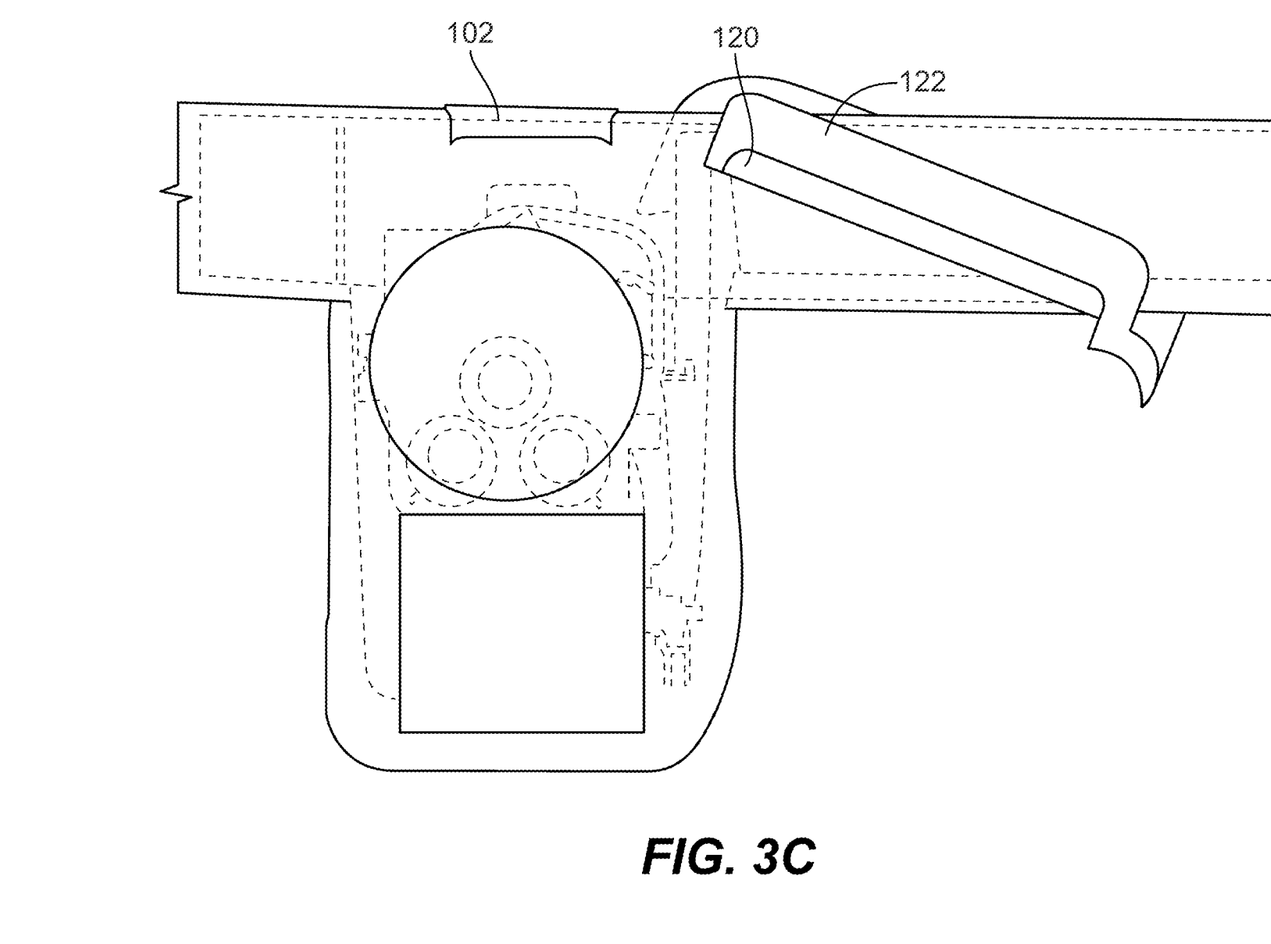
FIG. 3c is a side view of FIG. 2b, showing the nacelle doors in an open position with the heat exchangers attached to the cowls.

As seen in FIGS. 3a and 3b, the glycol/air heat exchangers 120 can be secured in place and not move along with the cowl doors 122, when the cowl doors 122 are opened for maintenance. It is also considered, As seen in FIG. 3c, the side heat exchangers can be attached to each of the nacelle cowls, which can be hingedly attached to the nacelle body 102, wherein the nacelle access doors allow for drip testing when placed in the open position. The cowls can swing open such that the engine or engines are exposed to the ground with allowing any fluids excreted by the engine or engines to reach the ground.

Figure 4A:
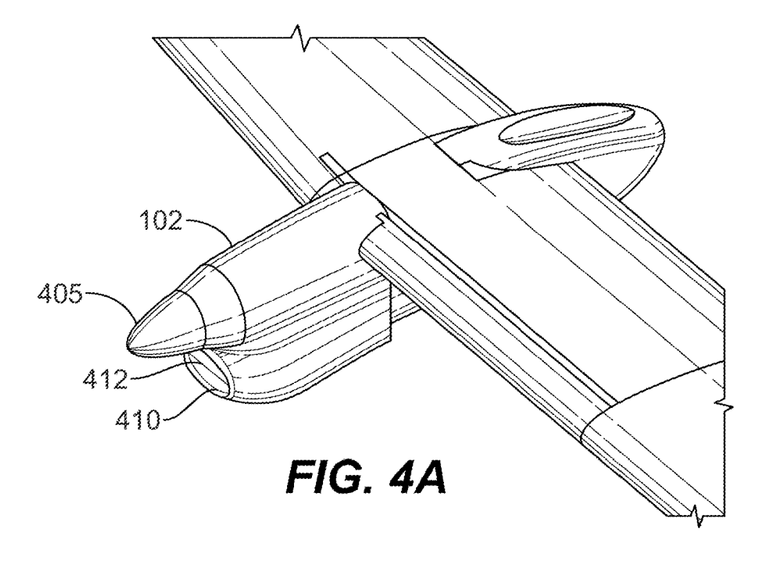
FIG. 4a is a perspective view of a cooling system with a horizontal splitter.
Figure 4B:
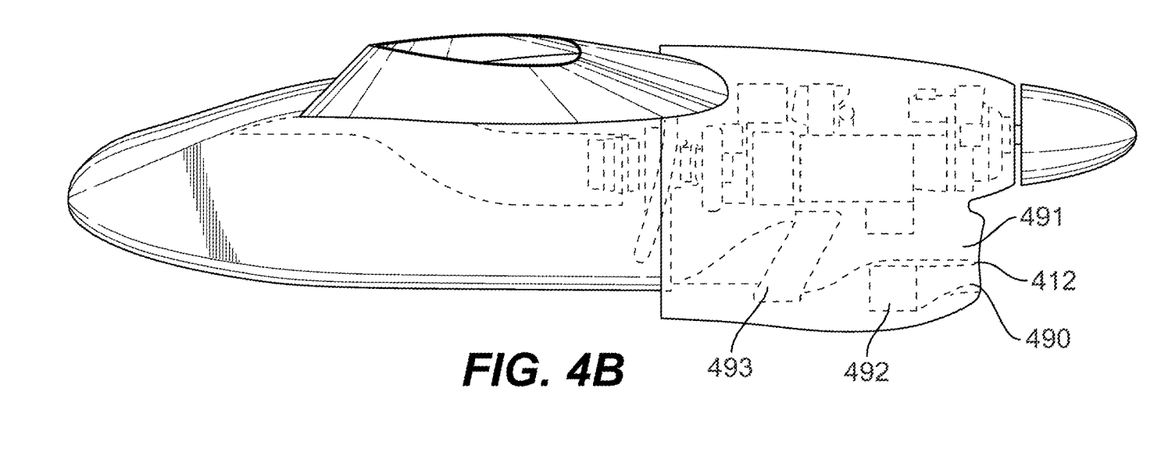
FIG. 4b is a side view of FIG. 4a, showing two channels leading to two different heat exchangers.

Referring to FIGS. 4a -and 4b, a cooling system for a nacelle of an aircraft of a having hybrid-electric propulsion system can include a nacelle body 102 including a bottom cooling air intake 410 disposed below a propeller hub 405 for supplying air to an oil-air cooler, wherein the bottom cooling air intake includes a horizontal splitter 412 dividing the bottom cooling air intake into a first channel and a second channel. As seen in FIGS. 4a and 4b the horizontal splitter 412 forms two separate channels, with the first channel 490 leading to a first heat exchanger 492, and the second channel 491 leading to a second heat exchanger 493, where the first heat exchanger 492 is an air-oil heat exchanger, and the second heat exchanger 493 is a glycol air heat exchanger.

Figure 5A:
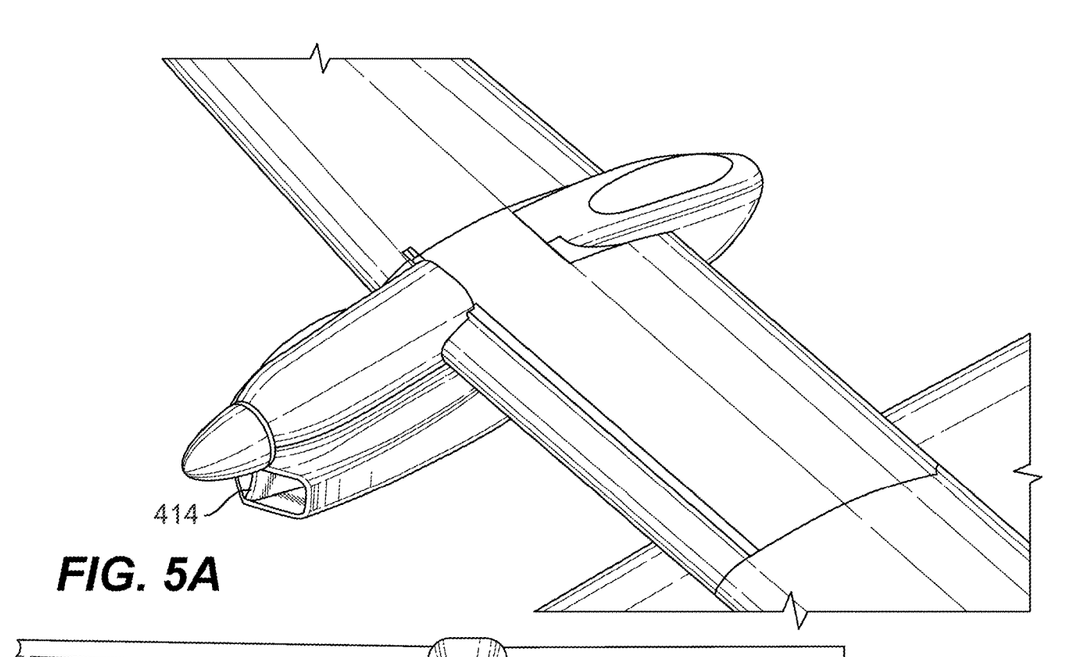
FIG. 5a is a front view a system with a horizontal splitter, showing two channels leading to two different heat exchangers, and a channel leading to a turbine compressor assembly.
Figure 5B:
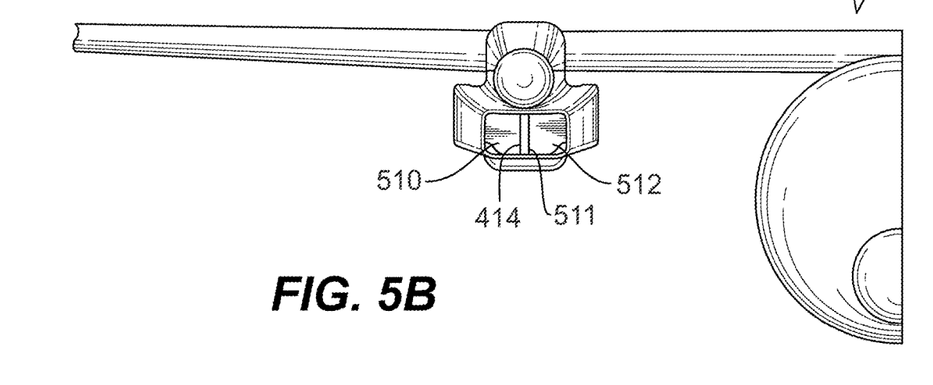
FIG. 5b is a perspective view FIG. 5a of a cooling system with a vertical splitter.

As seen in FIGS. 5a and 5, a vertical splitter 414 can form three separate channels which lead to different air intakes and different heat exchangers. The splitter can form three separate channels 510, 511, and 512, with the first channel 510 leading to a first heat exchanger, the second channel 511 leading to a second heat exchanger, and a third channel 512 leading to a turbine compressor assembly, wherein the first heat exchanger 492 is an air-oil heat exchanger, and the second heat exchanger 493 is a glycol air heat exchanger.

It is further envisioned that the heat motor of the system described above could be a heat engine of any type, e.g., a gas turbine, spark ignited, diesel, rotary or reciprocating engine of any fuel type and with any configuration of turbomachiney elements, either turbocharger, turbo supercharger, supercharger and exhaust recovery turbo compounding, either mechanically, electrically, hydraulically or pneumatically driven. An example of a rotary engine suitable for this application is disclosed in U.S. Pat. No. 10,145,291, the disclosure of which is herein incorporated by reference in its entirety.

The methods and systems of the present disclosure, as described above and shown in the drawings, provide for electrical power system with superior properties including increased reliability and stability, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A cooling system for an engine of an aircraft having a hybrid-electric propulsion system comprising:
    an oil-air cooler;
    a nacelle body defining and including a first side cooling air intake disposed on a first side of the nacelle body and a second side cooling air intake disposed opposite the first side cooling air intake with a propeller hub disposed therebetween;
    a bottom cooling air intake disposed below propeller hub and fluidly connected to the oil-air cooler, the bottom cooling air intake including a splitter dividing the bottom cooling air intake into at least a first channel and a second channel; and
    a turbine compressor assembly intake disposed above the bottom cooling air intake and below the propeller hub, the turbine compressor assembly intake configured for supplying air to a compressor of the engine.

2. The cooling system of claim 1, wherein the turbine compressor assembly air intake is concentrically connected to a downstream turbine located inside the nacelle body.

3. The cooling system of claim 1, wherein the first side cooling air intake and the second side cooling air intake each include a duct inlet defining an area elongated in a vertical direction with respect to gravity.

4. The cooling system of claim 3, wherein the first side cooling air intake and the second side cooling air intake each include an outlet aft of the duct inlet.

5. The cooling system of claim 4, wherein each outlet includes a variable exhaust area.

6. The cooling system of claim 4, wherein the bottom cooling air intake is elongated in a direction from the first side cooling air intake and the second side cooling air intake.

7. The cooling system of claim 1, wherein the first side cooling air intake and the second side cooling air intake are each fluidly connected to a glycol/air heat exchanger for cooling the hybrid- electric propulsion system.

8. The cooling system of claim 7, wherein the glycol/air heat exchanger is attached to a nacelle cowl hingedly attached to the nacelle body.

9. The cooling system of claim 8, wherein the nacelle cowl allows for drip testing when placed in the open position.

10. The cooling system of claim 1, wherein a glycol cooler and two oil coolers are disposed within the nacelle body.

11. The cooling system of claim 1, wherein the first channel leads to the air-oil cooler, and the second channel leads to a glycol-air heat exchanger.

12. An aircraft including the cooling system of claim 1 attached to a first wing of the aircraft.

13. The aircraft of claim 12, further comprising a second wing, and wherein the first and second wings each have a respective one of the cooling system of claim 1.

14. The aircraft of claim 12, wherein the nacelle body is attached to an underside of the first wing of the aircraft.

15. An engine of an aircraft having a hybrid-electric propulsion system, the engine comprising:
   a propeller hub;
   a turbine compressor assembly comprising a compressor driven by a turbine;
   an oil-air cooler;
   a nacelle body having a bottom cooling air intake disposed below the propeller hub and in fluid communication with the oil-air cooler, a first side cooling air intake and a second side cooling air intake disposed on opposite sides of the propeller hub;
   a splitter dividing the bottom cooling air intake into at least a first channel and a second channel; and
   a turbine compressor assembly intake disposed above the bottom cooling air intake and below the propeller hub, the turbine compressor assembly intake fluidly connected to the compressor.

16. The engine of claim 15, wherein the splitter is vertically aligned.

17. The engine of claim 16, wherein the splitter forms three separate channels, with the first channel leading to a first heat exchanger, and the second channel leading to a second heat exchanger, and a third channel leading to a turbine compressor assembly.

18. The engine of claim 15, wherein the splitter is horizontally aligned.

\* \* \* \* \*